May 23, 1944. E. A. DAVIS 2,349,651
SCREW THREAD FOR HIGH STRENGTH BOLTING
Filed June 17, 1942

WITNESSES:

INVENTOR
Evan A. Davis.
BY
ATTORNEY

Patented May 23, 1944

2,349,651

UNITED STATES PATENT OFFICE 2,349,651

SCREW THREAD FOR HIGH STRENGTH BOLTING

Evan A. Davis, Wilkinsburg, Pa., assignor to Westinghouse Electric & Manufacturing Company, East Pittsburgh, Pa., a corporation of Pennsylvania Application June 17, 1942, Serial No. 447,363

4 Claims. (Cl. 85—32)

My invention relates to a nut and bolt construction and more particularly to an improvement in the thread construction of the threads of the nut in relation to the threads of the bolt coacting therewith.

One of the major problems worrying steam turbine engineers is the bolting problem. In the past few years, quite a few bolt failures in the turbine casing in large steam turbines have taken place. A study of these failures shows that the bolts without exception failed in the first few, more often the first, threads of the bolt coacting with the threads of the nut adjacent the supporting base for the nut. It is thus apparent that the tension stresses in the bolt are concentrated in this region.

One object of my invention is to provide for distributing the tension stresses in a bolt over a greater portion of the length of the threaded portion of the bolt coacting with the threads of a nut.

One broad object of my invention is to reduce the extreme fiber stresses in a bolt coacting with a nut.

One object of my invention is to improve the standard Acme threads of a nut so as to distribute the total load carried by the threads of a nut over substantially the entire length of the nut.

Other objects and advantages of my invention will become more apparent from a study of the following specification and the accompanying drawing, in which.

Figure 1:
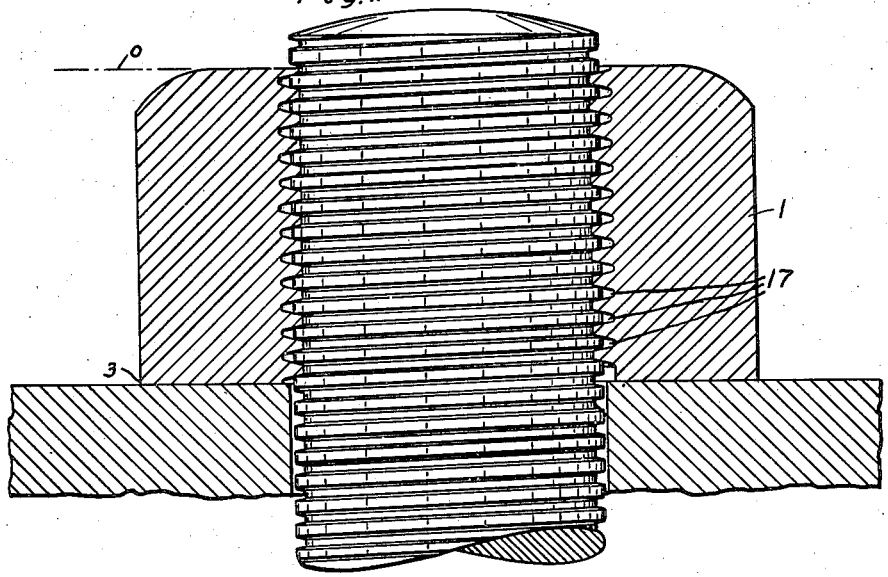
Figure 1 shows a longitudinal section of a bolt and nut assembly showing standard Acme threads modified to include my invention.
Figure 3:
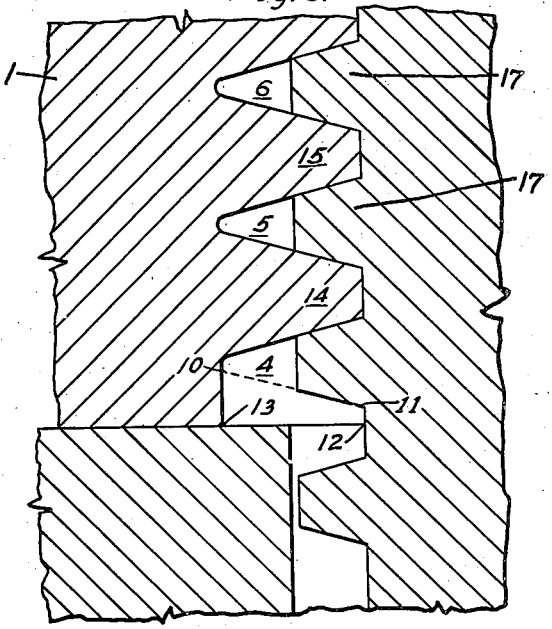
Fig. 3 is a more detailed sectional showing of my contribution to the art.

When the tension load in a bolt is transmitted to a nut through a system of threads, the nut, if of standard design, is subjected to a compression load. This means that in the region of thread engagement between nut and bolt, the pitch distance of the threads in the bolt is increased, since the bolt is lengthened, and the pitch distance of the threads in the nut is decreased, because the length of the nut is decreased. These two effects are incompatible with each other. This incompatible effect of extension and compression on the bolt and nut, respectively, plus some other factors due to the load causes the greatest part of the load to be concentrated at the first few threads that are engaged. The load concentration is in the region 17 indicated in Figs. 1 and 3.

Figure 2:
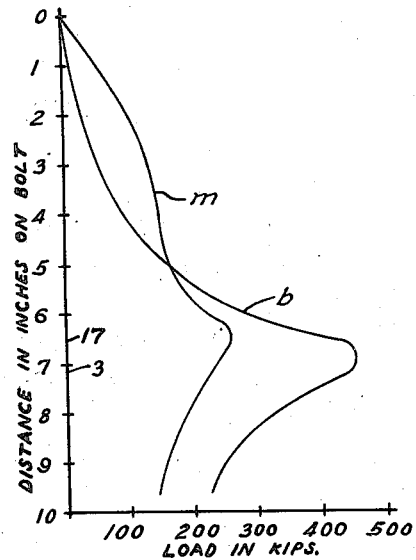
Fig. 2 shows curves illustrating the advantages obtained by my new construction.

Curve b, Fig. 2, illustrates how the load distribution on the bolt varies along the nut counting down from the top of the nut. The nuts and bolts in steam turbine housings are of considerable size so that the ordinate is used to indicate length along the bolt, say, in inches and the abscissa indicates load, say, in kips. At 0, which is the top of the nut, see Figs. 1 and 2, the tension load in the bolt is zero, while between the regions 6 and 7 substantially at 17 and just above 3 which is at the bottom of the nut, the load is a maximum. The problem is to avoid this tension load concentration in the bolt in the region of the bottom of the nut. For the curve b, relating to a large bolt, the load is in the neighborhood of 450 kips.

This difference in effect on the nut and bolt and the consequent load concentration has been recognized by others and nuts have been proposed that have been so designed that the nut on a bolt, when a tension load is applied on the bolt, is also in tension. This requires a complicated and expensive nut structure, requires a nut that has a diameter that is three to four times the diameter of the bolt, and requires an opening through the base that is entirely out of proportion to the diameter of the bolt. Further all these prior art efforts still do not properly distribute the tension load of the bolt along the nut.

Standard nuts as used in this country have an outside diameter twice that of the bolt with which they cooperate. This means that the area of the nut under compression is three times the area of the bolt under tension. The threads of the nut are thus analogous to a plurality of very rigid vertically spaced horizontally disposed beams supported at their ends, subjected to loads at their midpoints by a single relatively elastic tension member rigidly connected to the beams. Reduced to such simple analogy, it is quite apparent that the lowermost beam will carry by far the greatest portion of the total load.

However, if one visualizes a plurality of quite elastic vertically spaced horizontally disposed beams supported at their ends subjected to loads at their midpoints by a single quite rigid tension member rigidly connected to the beams, one can readily see that the total load will be divided more equally between the beams.

An increase in the flexibility of the threads will thus cause a wider distribution of these peak stresses and will thus increase the strength of the bolt.

To obtain this increase in flexibility, I resort to the simple expedient of under cutting the threads of a nut 1 as indicated at points 4, 5, 6, etc. The threads of the bolt are not altered in the least. I also relieve the nut as indicated by the area bounded by 10, 11, 12, and 13. By thus relieving the nut the upward pressure of the tightening surface is removed radially as far as this can be done, by merely relieving the nut to the depth of the undercut for the threads, from the center of the bolt. This means that the lowermost thread 14 is likely to be the most flexible and the force is transferred somewhat directly to the thread 15. The important thing, however, is the flexibility of all the threads.

This greater flexibility of the threads causes a wider distribution of the load on the successively vertically disposed nut threads. This is shown by curve m.

Further, there is no necessity for an increase in the diameter of the nut. This is particularly true of nuts and bolts utilizing Acme threads where the hoop stresses are low.

Acme threads have a pitch of 29° as against 60° for United States standard threads. In the United States standard the hoop stresses are thus greater. My invention is thus of particular value in connection with Acme threads; however, I do not wish to be limited by the particular showing made, but wish to be limited only by the scope of the claims hereto appended.

I claim as my invention:

1. In a bolt and nut assembly for firmly holding machine elements together, in combination, a bolt, subject to a tension load, having conventional threads for coaction with a nut, a nut having threads that are undercut in line with the faces of the threads to thus make the threads flexible in the direction of the pull of the bolt, the threads otherwise being of conventional design to fit the threads of the bolt, the nut also having the first thread that normally, in placing the nut on the bolt, engages the threads of the bolt, cut away to the depth of the undercut for the threads of the nut, whereby the tension load is more evenly distributed to substantially all the threads of the nut.

2. A bolt and nut each provided with screw threads having like pitch and like angles upon the thread sides, the threads of the bolt having flat crests and flat thread valleys and the threads of the nut having flat crests to lie contiguous to the flat valleys of the threads of the bolt but the valleys of the threads of the nut being deep so that the flat crests of the bolt threads are spaced from the base of the valleys of the nut threads.

3. A pair of interfitting members comprising an inner member and an outer member, said members having complementary screw threads of like pitch and like angles upon their sides, the screw threads of the outer member being deepened so that the screw threads of the outer member have a greater axial flexibility than the screw threads of the inner member.

4. A bolt member and a nut member, each of said members being provided with conventional threads for threaded interengagement, the threads on one of said members being undercut so that the root-line of said one member is spaced from the crests of the teeth on the other of said members a distance substantially greater than the root-line in conventional thread designs, said undercutting being effective to increase the depth of the threads on said one member to thereby increase the flexibility of such threads and enable a load on said members to be distributed more uniformly over the intermeshed teeth than in conventional designs.

EVAN A. DAVIS.